United States Patent Office 3,794,596
Patented Feb. 26, 1974

3,794,596
METHOD OF AND COMPOSITION FOR THE PREVENTION OF SCALE
Jack Franklin Tate, Houston, Tex., assignor to Texaco Inc., New York, N.Y.
No Drawing. Continuation-in-part of abandoned application Ser. No. 831,219, June 6, 1969. This application Mar. 8, 1971, Ser. No. 122,127
Int. Cl. C10m 3/26
U.S. Cl. 252—180                                                   13 Claims

ABSTRACT OF THE DISCLOSURE

Method of and composition for the prevention of scale, particularly calcium sulfate scale, using a water soluble 1,2'-hydroxyethyl-2-hydrocarbyl - 2 - imidazoline wherein the hydrocarbyl group contains from about 12 to about 20 carbon atoms and salts thereof.

---

This application is a continuation-in-part of application of application Ser. No. 831,219, filed June 6, 1969, now abandoned.

This invention relates to a composition useful in treating oil and gas wells and to a method of using such composition for such treatment. More particularly, this invention is directed to a composition and method useful in the prevention and/or inhibition of the build-up of undesirable inorganic mineral scale deposits in oil and gas wells, their flows lines, auxiliary producing equipment, such as heat exchangers and cooling towers, as well as the producing strata in the vicinity of the well bore. Additionally, the invention is useful in the prevention and/or inhibition of build-up of scale deposits in aqueous systems susceptible to mineral scale formation.

The formation of objectionable scale deposits, such as calcium or barium sulfate is rather widespread in certain production areas, and has been attributed to several causes. One generally accepted theory of scale formation is that of chemical precipitation resulting from the commingling of two fluid streams each of which contains a concentration of a particular ion such that when they commingle an unstable water is produced. For example, in the case of calcium sulfate scale formation, one stream contains sulfate ions, and the other calcium ions in such concentration so as to produce an unstable water. The mixing of these streams may result in the deposition of a hard crystalline calcium sulfate deposit which gradually builds up on the walls of the wall tubing, for example, to a point where it may choke off fluid flow in the tube if remedial measures were not undertaken.

Another cause of the scale formation is attributed to the precipitation of scale material from potentially supersaturated solutions thereof. When the operating variables of temperature and pressure change adversely, or solvent is allowed to evaporate, thus concentrating the solution, precipitation of the salt on the tubing and surrounding strata occurs.

The use of strong alkali solutions for the removal of sulfate scale has been proposed. It has been claimed that under certain favorable conditions of temperature and time, concentrated alkali solutions will, in some cases, provide a break-up of the built-up scale after relatively long periods of treatment. If, for example, a calcium sulfate scale is treated with concentrated potassium hydroxide for comparatively long periods of time, say from 24 to 72 hours, it has been claimed that a white fluffy precipitate of calcium hydroxide will be formed. This precipitate may then be removed by suitable mechanical means. Such a method is obviously undesirable in that considerable periods of time are involved and the use of mechanical apparatus is expensive, and in some cases, either undesirable or mechanically impossible. Moreover, strong alkali is not effective in preventing or inhibiting the build-up of scale deposits in well tubing production equipment and the producing strata about the bore hole.

It is, accordingly, an object of this invention to provide a method of inhibiting and/or preventing the build-up of scale deposits in gas and oil flow lines, auxiliary equipment, well tubing and the surrounding subsurface strata.

A further object is to provide a scale treating composition for use in preventing the build-up of scale deposits in the well tubing, producing equipment, the bore hole and surrounding strata.

A still further object of this invention is to provide a method of and composition for the treatment of gas and oil well tubing and the like containing sulfate scale therein to prevent and/or inhibit the build-up of further scale deposits in the tubing.

These as well as other objects are accomplished according to the present invention which comprises a scale prevention and/or inhibition composition consisting of an aqueous solution of a water soluble 1,2'-hydroxyethyl-2-hydrocarbyl-2-imidazoline wherein the hydrocarbyl group contains from 12 to 20 carbon atoms, and the corresponding amine salts thereof such as the acetate, hydrochloride and phosphate.

As used in the specification and claims, the term "hydrocarbyl" includes the alkyl, alkenyl and alkadienyl radicals. The term "imidazoline" in the subsequent portions of the specification refers to the above-specified type compound.

Representative hydrocarbyl groups include the tetradecyl, hexadecyl, octadecyl, eicosyl, octadecenyl, octadecadienyl group and mixtures thereof. Preferred groups are the heptadecyl and the heptadecenyl groups.

The invention also comprises a method of treating water contacting equipment susceptible to the development of scale deposits therein such as water storage tanks and the like, particularly oil field equipment, using the scale prevention composition.

In carrying out one aspect of the present invention the method thereof comprises introducing the scale prevention composition into the equipment to be protected, such as oil well tubing, in the form of an aqueous solution in an amount sufficient to provide the imidazoline therein at a concentration of from about 0.0003 to about 0.003% by weight and maintaining the scale treating composition in contact with the internal surfaces thereof therein for a contact time sufficient to prevent and/or inhibit the development of scale deposits or additional scale deposits therein. It is desirable to circulate the scale prevention composition through the system to provide adequate contact of the composition with the surfaces to be protected. Underground starta surrounding the well bore can be treated in a like manner, i.e. by passing the solution into said strata such as by injection of the solution down through the bore hole or production tubing, preferably under pressure.

The scale prevention composition of the present invention is preferably used in an amount sufficient to provide to treating solution the imidazoline in an amount of from about 0.0005 to about 0.001% by weight. Higher concentrations (above about 0.003%) do not provide improved scale protection.

A more complete understanding of the invention will be obtianed from the following illustrative examples.

The following procedure was used in the evaluations.
A 1000 milliliter glass beaker was provided with sufficient calcium sulfate and sodium chloride, obtained by mixing solutions of calcium chloride and sodium sulfate, to produce an aqueous concentration thereof of 10,000 parts per million of calcium sulfate and 50,000 parts per million of sodium chloride. A preweighed metal rotor attached to an externally provided mechanical stirring device was immersed in the test solution for a 24 hour time period. The solution was maintained at a temperature of 104° F. during the test period. At the end of the 24 hours, the rotor was removed from the solution and from the stirrer, the scale deposited thereon removed, dried and weighed. In all, several tests were conducted on each material being evaluated and the average of the tests was taken as the amount of scale deposit. The above laboratory test procedure affords good correlation between the results thereby obtained and larger scale field evaluations of scale preventing compositions.

The following table records the results of the tests.

TABLE

| Example | Additive | Average weight of scale (gr). amount of additive (p.p.m.) | | |
|---|---|---|---|---|
| | | 0 | 5 | 10 |
| Control | | 1.37 | | |
| No. 1 | A [1] | | 0.0 | 0.0 |
| No. 2 | B [2] | | 0.0 | 0.01 |

[1] Additive A is 1,2'-hydroxyethyl-2-hydrocarbyl-2-imidazoline wherein the hydrocarbyl group is obtained from the fatty radicals of tall oil.
[2] Additive B is 1,2'-hydroxyethyl-2-heptadecyl-2-imidazoline.

From the data present in the above table, it is evident that the imidazolines of the present invention are effective calcium sulfate scale inhibitors at low concentrations.

Obviously, other modifications and variations of the invention as hereinbefore set forth may be made without departing from the spirit and scope thereof and therefore only such limitations should be imposed as are indicated in the appended claims.

I claim:

1. A method of controlling the build-up of calcium and/or barium sulfate scale deposits in an aqueous system which comprises incorporating in said system a scale treating composition consisting essentially of an aqueous solution of a water soluble compound selected from the group consisting of 1,2'-hydroxyethyl-2-hydrocarbyl-2-imidazoline containing from about 12 to about 20 carbon atoms in the hydrocarbyl group and the corresponding acetate, hydrochloride and phosphate salts thereof, said treating composition being employed in an amount sufficient to inhibit the development of scale in an aqueous system and wherein said imidazoline is present in said solution in an amount of from about 0.0003 to 0.003% by weight.

2. Method as claimed in claim 1 wherein said imidazoline is 1,2'-hydroxyethyl-2-heptadecenyl-2-imidazoline.

3. Method as claimed in claim 2 wherein said imidazoline is 1,2'-hydroxyethyl-2-heptadecyl-2-imidazoline.

4. Method as claimed in claim 1 wherein said salt is a hydrochloride.

5. Method as claimed in claim 1 wherein said salt is a phosphate.

6. Method as claimed in claim 1 wherein said salt is an acetate.

7. Method as claimed in claim 1 wherein said imidazoline is present in said system in an amount of from about 0.0005 to 0.001% by weight.

8. A calcium and/or barium sulfate scale inhibiting composition consisting of an aqueous solution of a compound selected from the group consisting of a water soluble 1,2'-hydroxyethyl-2-hydrocarbyl-2-imidazoline containing from about 12 to about 20 carbon atoms in the hydrocarbyl group and the corresponding acetate, hydrochloride and phosphate salts thereof, said treating composition being used in an amount sufficient to inhibit the development of scale in said system and wherein said imidazoline is present in the aqueous solution at a concentration of from about 0.0003 to 0.003% by weight.

9. A scale inhibiting composition as claimed in claim 8 wherein said imidazoline is 1,2'-hydroxyethyl-2-heptadecenyl-2-imidazoline.

10. A scale inhibiting composition as claimed in claim 8 wherein said imidazoline is 1,2'-hydroxyethyl-2-heptadecyl-2-imidazoline.

11. A scale inhibiting composition as claimed in claim 8 wherein said salt is a hydrochloride.

12. A scale inhibiting composition as claimed in claim 8 wherein said salt is a phosphate.

13. A scale inhibiting composition as claimed in claim 8 wherein said salt is an acetate.

References Cited

UNITED STATES PATENTS

| | | | |
|---|---|---|---|
| 2,987,522 | 6/1961 | Shen | 260—309.6 |
| 3,086,938 | 4/1963 | Means | 252—8.55 |
| 2,414,668 | 1/1947 | Ratcliffe | 252—8.55 |
| 2,945,821 | 7/1960 | Sterlin | 252—392 |
| 3,138,610 | 6/1964 | Buc | 260—309.6 |
| 3,268,476 | 8/1966 | Matlock | 260—45.75 |
| 3,514,399 | 5/1970 | Robinson | 252—8.5 |

GEORGE F. LESMES, Primary Examiner

M. E. McCAMISH, Assistant Examiner

U.S. Cl. X.R.

21—2.7; 134—2, 3, 41; 252—8.55 B, 82; 260—309.6